C. A. BASTIEN.
NUT LOCK.
APPLICATION FILED NOV. 30, 1914.
1,193,974.
Patented Aug. 8, 1916.
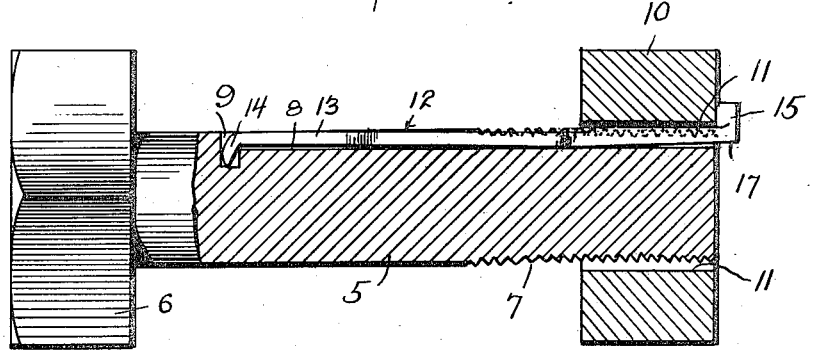
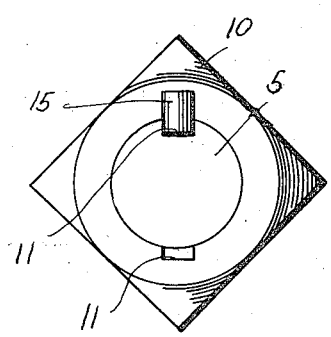
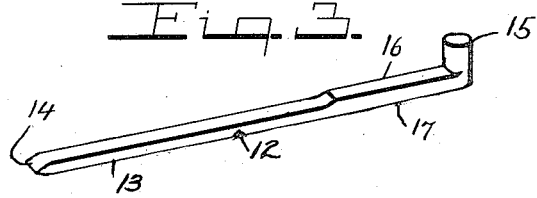
Inventor
C. A. Bastien

UNITED STATES PATENT OFFICE.

CESAR A. BASTIEN, OF NEWPORT, MICHIGAN, ASSIGNOR OF ONE-HALF TO CHARLES H. BARRON, OF NEWPORT, MICHIGAN.

NUT-LOCK.

1,193,974.   Specification of Letters Patent.   Patented Aug. 8, 1916.

Application filed November 30, 1914. Serial No. 874,925.

*To all whom it may concern:*

Be it known that I, CESAR A. BASTIEN, a subject of the King of Great Britain, residing at Newport, in the county of Monroe and State of Michigan, have invented certain new and useful Improvements in Nut-Locks; and I do hereby declare the following to be a full, clear, and exact description of the invention, such as will enable others skilled in the art to which it appertains to make and use the same.

This invention has for its object to provide a novel and efficient nut lock including a longitudinally slotted bolt having a recess or seat at the inner end of the slot into which one end of a nut locking pin is adapted to be driven to lock said pin against longitudinal movement in the slot.

Another object is the provision of a nut lock including a locking pin seated in a slot in a bolt and having an enlargement or shoulder thereon adapted to engage within one of a plurality of slots formed in the bore of the nut for locking the latter against rotation on the bolt and also having a head at the outer extremity whereby the locking pin may be conveniently removed with a suitable tool.

Another object is the provision of a pin adapted to engage within a slotted bolt to lock a nut thereon and having one end beveled or cut away so that as the pin is moved inwardly within the slot the inner extremity thereof will be tilted upwardly so as not to engage the inner wall of the slot and thus stop the movement thereof.

With these and other objects in view, the invention consists in the novel construction, arrangement and formation of parts as will be hereinafter specifically described, claimed and illustrated in the accompanying drawing, in which:

Figure 1 represents a side elevation, partly in section, of a nut and bolt constructed in accordance with this invention. Fig. 2 represents an end elevation of the nut and bolt, and Fig. 3 represents a perspective view of the locking pin or key removed.

Referring to the drawing in detail, wherein similar reference numerals designate corresponding parts throughout the several views, the numeral 5 indicates the shank of a bolt of the usual or any preferred construction having the head 6 at one end and having screwthreads 7 extending inwardly from the opposite end. The shank 5 is provided with a longitudinal slot or groove 8 extending inwardly from the threaded end a distance beyond the screw-threads 7 and having a depression or seat 9 formed at its inner end. A nut 10 is formed with a threaded bore and is fitted upon the threaded shank 5 and is provided with diametrically opposed grooves or slots 11 in the bore thereof adapted to be moved into registration with the groove 8 to receive a locking pin or key, to be hereinafter described.

The locking means consist in an elongated pin designated generally by the numeral 12 which is preferably rectangular in cross section and having a tapered end portion 13 terminating in a point 14 and a head 15 projecting laterally from the opposite end. The inner portion of the pin or key lies flush with the outer surface of the bolt 5 and at its headed end the pin or key 12 is formed with a longitudinal enlargement or shoulder 16 which projects outwardly of the threads of the bolt and is adapted to engage in either one of the diametrically opposed grooves or slots 11 in the nut 10 to lock the latter against rotation on the bolt 5 when the key or pin is seated in the groove or slot 8. The side of the locking pin or key 12 opposite the head 15 is cut away or beveled as shown at 17 for approximately the length of the enlargement or shoulder 16, whereby as the key or pin is slipped inwardly in the groove or slot 8 the pointed end 14 thereof will be guided over the inner wall of the groove 8 and thus not retard the inward movement of the pin.

In use, the nut 10 is adjusted to the desired position on the bolt 5 and the locking pin or key 12 is subsequently slipped into the groove 8, it being understood that one of the diametrically opposed grooves or slots 11 in the nut 10 is first moved into registration with the groove 8 in the shank. The inclined or beveled face 17 of the pin 12 permits the outer headed extremity 15 to be pressed inwardly, thus swinging the inner extremity 14 thereof clear of the wall of the seat 9 and permitting the key or pin to be moved inwardly until the head 15 engages the outer face of the nut 10. After the head 15 is engaged with the nut 10 the inner extremity of the pin 12, which overlies the bolt, is cut to the proper length and that portion overlying the recess 9 is struck inwardly, as illustrated in Fig. 1, to prevent subsequent accidental longitudinal movement of the pin in the groove 8. In this position it is clearly evident that the nut 10 is reliably locked against rotation on the bolt 5 and that the locking pin is reliably retained against accidental loss by the angularly directed end 14 thereof engaged in the depression or seat 9

What I claim is:

A nut lock comprising a bolt including a threaded shank having a longitudinally disposed slot extending inwardly from the threaded end thereof and terminating at its inner extremity in a depression or seat, a nut threaded on said bolt and having diametrically opposed slots, a locking pin engaged in the slot in said bolt having an inner extremity directed inwardly and engaged within said seat or depression and having a portion of the inner face at the outer end beveled, an enlargement formed opposite said beveled surface, extending longitudinally of said pin and engaged in one of the slots in said nut to lock the latter against rotation, and a head at the outer extremity of said pin engaging the outer face of said nut.

In testimony whereof I affix my signature in presence of three witnesses.

CESAR A. BASTIEN.

Witnesses:
ELI NEDEAR,
GEO. W. FRANCISCO,
HENRY LAFOUNTAIN.